United States Patent
Vo et al.

(10) Patent No.: US 9,725,639 B2
(45) Date of Patent: Aug. 8, 2017

(54) WELLBORE SERVICING MATERIALS AND METHODS OF MAKING AND USING SAME

(71) Applicant: Halliburton Energy Services, Inc., Houston, TX (US)

(72) Inventors: Loan Vo, Houston, TX (US); Feng Liang, Cypress, TX (US); Tingji Tang, Spring, TX (US); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/901,785

(22) PCT Filed: Jul. 31, 2013

(86) PCT No.: PCT/US2013/053029
§ 371 (c)(1),
(2) Date: Dec. 29, 2015

(87) PCT Pub. No.: WO2015/016911
PCT Pub. Date: Feb. 5, 2015

(65) Prior Publication Data
US 2016/0137907 A1    May 19, 2016

(51) Int. Cl.
*C09K 8/68* (2006.01)
*C09K 8/80* (2006.01)
(Continued)

(52) U.S. Cl.
CPC .............. *C09K 8/68* (2013.01); *C09K 8/26* (2013.01); *C09K 8/602* (2013.01); *C09K 8/70* (2013.01);
(Continued)

(58) Field of Classification Search
None
See application file for complete search history.

(56) References Cited

U.S. PATENT DOCUMENTS

| 4,532,052 A | * | 7/1985 | Weaver | .................. C09K 8/508 |
|---|---|---|---|---|
| | | | | 166/275 |
| 5,439,059 A | | 8/1995 | Harris et al. | |

(Continued)

FOREIGN PATENT DOCUMENTS

| NO | GB 2453317 A | * | 4/2009 | ............. C09K 8/506 |
|---|---|---|---|---|
| WO | 2008-143544 A1 | | 11/2008 | |

OTHER PUBLICATIONS

International Preliminary Report on Patentability issued in related PCT Application No. PCT/US2013/053029 mailed Feb. 11, 2016, 13 pages.

(Continued)

*Primary Examiner* — Jeffrey Washville
(74) *Attorney, Agent, or Firm* — Craig W. Roddy; Baker Botts L.L.P.

(57) ABSTRACT

A method of servicing a wellbore in a subterranean formation comprising preparing a wellbore servicing fluid comprising a particulate material, an aqueous base fluid, an oleaginous fluid, and a macromolecular surfactant, and placing the wellbore servicing fluid in the wellbore and/or subterranean formation to consolidate and/or enhance conductivity of at least a portion of the wellbore and/or subterranean formation. A method of servicing a wellbore in a subterranean formation comprising preparing a wellbore servicing fluid comprising a particulate material, an aqueous base fluid, an oleaginous fluid, and a macromolecular surfactant, wherein the particulate material comprises sand, and the macromolecular surfactant comprises a hydrophobically modified polyethyleneimine, and placing the wellbore servicing fluid in the wellbore and/or subterranean formation to consolidate and/or enhance conductivity of at least a portion of the wellbore and/or subterranean formation.

12 Claims, 1 Drawing Sheet

(51) Int. Cl.
    *C09K 8/26* (2006.01)
    *C09K 8/60* (2006.01)
    *C09K 8/70* (2006.01)
    *C09K 8/88* (2006.01)
    *C09K 8/92* (2006.01)

(52) U.S. Cl.
    CPC .................. *C09K 8/80* (2013.01); *C09K 8/88* (2013.01); *C09K 8/885* (2013.01); *C09K 8/92* (2013.01)

(56) References Cited

U.S. PATENT DOCUMENTS

| | | |
|---|---|---|
| 7,238,646 B2 | 7/2007 | Thaemlitz et al. |
| 7,595,391 B2 | 9/2009 | Norman et al. |
| 8,105,986 B2 | 1/2012 | Zhang |
| 8,163,676 B2 | 4/2012 | Dakin et al. |
| 8,453,741 B2 | 6/2013 | Van Zanten |
| 2012/0181019 A1 | 7/2012 | Saini et al. |
| 2012/0267112 A1 | 10/2012 | Zhang et al. |

OTHER PUBLICATIONS

International Search Report and Written Opinion issued in related PCT Application No. PCT/US2013/053029 mailed Apr. 24, 2014, 17 pages.

\* cited by examiner

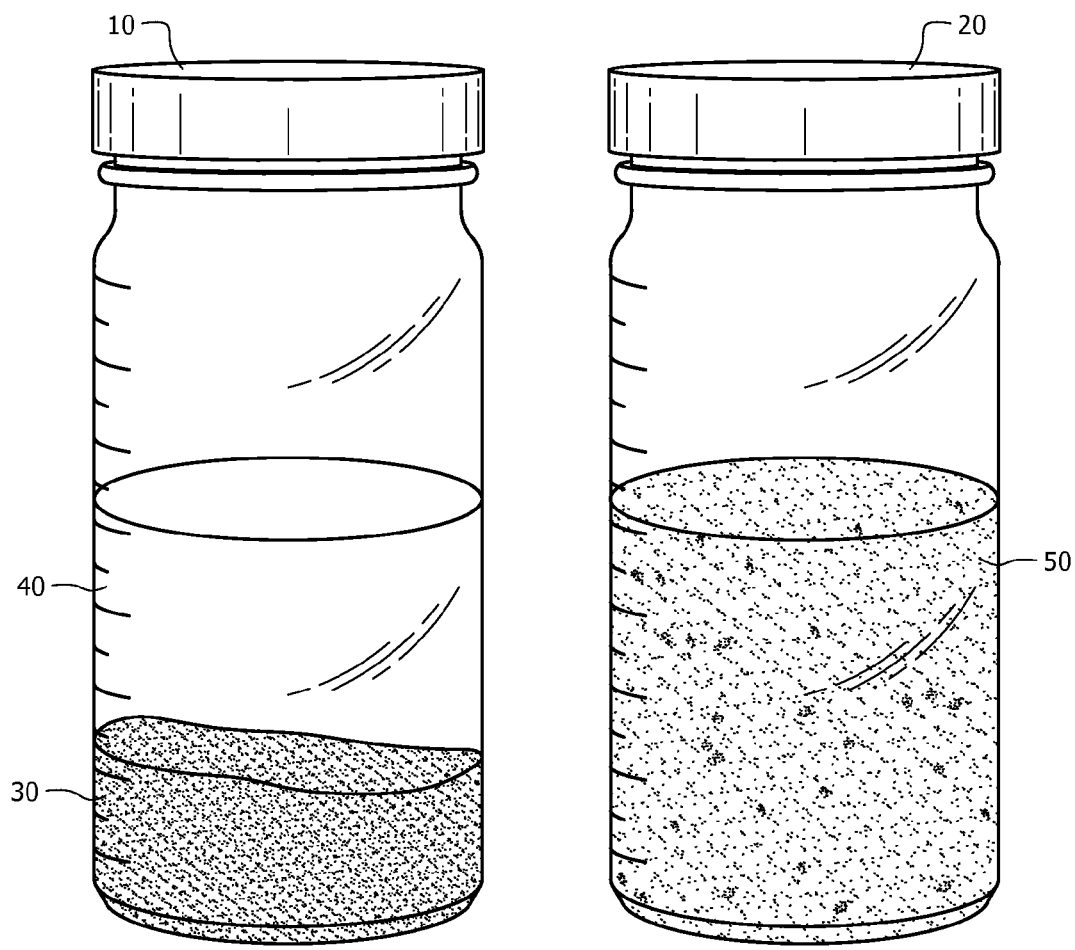

WELLBORE SERVICING MATERIALS AND METHODS OF MAKING AND USING SAME

CROSS-REFERENCE TO RELATED APPLICATION

The present application is a U.S. National Stage Application of International Application No. PCT/US2013/053029 filed Jul. 31, 2013, which is incorporated herein by reference in its entirety for all purposes.

BACKGROUND

This disclosure relates to methods of servicing a wellbore. More specifically, it relates to servicing a wellbore with particulate material compositions.

Natural resources (e.g., oil or gas) residing in the subterranean formation may be recovered by driving resources from the formation into a wellbore using, for example, a pressure gradient that exists between the formation and the wellbore, the force of gravity, displacement of the resources from the formation using a pump or the force of another fluid injected into the well or an adjacent well. The production of fluid in the formation may be increased by hydraulically fracturing the formation. That is, a treatment fluid (e.g., a fracturing fluid, a gravel packing fluid, etc.) may be pumped down the wellbore at a rate and a pressure sufficient to form fractures that extend into the formation, providing additional pathways through which the oil or gas can flow to the well.

Treatment fluids used in fracturing operations generally comprise polymers and crosslinkers (e.g., a cross-linked gel system) that are used for increasing the viscosity of the fluid such that particulate materials can be suspended in the fluid. These treatment fluids may have a complex set of ingredients and may require specialized conditions, such as for example specific pH values and the use of pH buffering agents.

Oftentimes, after the treatment fluid has performed its intended task, it may be desirable to reduce its viscosity (e.g., "break" the fluid or gel) so that the treatment fluid can be recovered from the formation and/or particulate material may be dropped out of the treatment fluid at a desired location within the formation. Breakers can be generally employed to reduce the viscosity of treatment fluids. Unfortunately, traditional breakers may result in an incomplete and/or premature viscosity reduction. Premature viscosity reduction is undesirable as it may lead to, inter alia, particulate material settling out of the fluid in an undesirable location and/or at an undesirable time. Alternately, encapsulated breakers may be used to control the release rate of breaker. However, such option adds to material costs. Thus an ongoing need exists for improved compositions and methods of using treatment fluids comprising particulate materials.

SUMMARY

Disclosed herein is a method of servicing a wellbore in a subterranean formation comprising preparing a wellbore servicing fluid comprising a particulate material, an aqueous base fluid, an oleaginous fluid, and a macromolecular surfactant, and placing the wellbore servicing fluid in the wellbore and/or subterranean formation to consolidate and/or enhance conductivity of at least a portion of the wellbore and/or subterranean formation.

Also disclosed herein is a method of servicing a wellbore in a subterranean formation comprising preparing a wellbore servicing fluid comprising a particulate material, an aqueous base fluid, an oleaginous fluid, and a macromolecular surfactant, wherein the particulate material comprises sand, and the macromolecular surfactant comprises a hydrophobically modified polyethyleneimine, and placing the wellbore servicing fluid in the wellbore and/or subterranean formation to consolidate and/or enhance conductivity of at least a portion of the wellbore and/or subterranean formation.

Further disclosed herein is a wellbore servicing fluid comprising a particulate material, an aqueous base fluid, an oleaginous fluid, and a macromolecular surfactant, wherein the macromolecular surfactant comprises a hydrophobically modified nitrogen-containing polymer, wherein the wellbore servicing fluid forms an oil-in-water emulsion with the oleaginous fluid discontinuously dispersed throughout a continuous aqueous phase and wherein the oil-in-water emulsion suspends the particulate material within the wellbore servicing fluid during transport.

Further disclosed herein is a method for preparing a wellbore servicing fluid comprising contacting a particulate material, an aqueous base fluid, an oleaginous fluid, and a macromolecular surfactant, and mixing the particulate material, the aqueous base fluid, the oleaginous fluid, and the macromolecular surfactant to form an oil-in-water emulsion to suspend and transport the particulate material to a desired location in a wellbore and/or subterranean formation.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 1 displays a visual comparison between a particulate material in water and the same particulate material suspended in a wellbore servicing fluid emulsion.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

Disclosed herein are wellbore servicing fluids or compositions (collectively referred to herein as WSFs) and methods of using same. In an embodiment, the wellbore servicing fluid may comprise a particulate material, a sufficient amount of an aqueous base fluid to form a pumpable WSF, an oleaginous fluid, and a sufficient amount of macromolecular surfactant to form a stable oil-in-water emulsion capable of suspending and transporting the particulate material to a desired location in a wellbore and/or subterranean formation. Utilization of a WSF comprising a particulate material and a macromolecular surfactant in the methods disclosed herein may advantageously facilitate the consolidation and/or enhancing the conductivity of at least a portion of the wellbore and/or subterranean formation. In an embodiment, the WSF is formulated as a fracturing fluid or a gravel packing fluid.

In an embodiment, the WSF comprises a particulate material. In an embodiment, the particulate material comprises a proppant, a gravel, or combinations thereof. As used herein, a particulate material refers to a granular material that is suitable for use in a particulate pack (e.g., a proppant pack and/or a gravel pack). When deposited in a fracture, the particulate material may form a particulate pack (e.g., a proppant pack and/or a gravel pack) structure comprising conductive channels (e.g., flow channel spaces) through which fluids may flow to the wellbore. The particulate material functions to prevent the fractures from closing due to overburden pressures.

In an embodiment, the particulate material may be comprised of a naturally-occurring material. Alternatively, the particulate material comprises a synthetic material. Alternatively, the particulate material comprises a mixture of a naturally-occurring and synthetic material.

In an embodiment, the particulate material comprises a proppant, which may form a proppant pack when placed in the wellbore and/or subterranean formation. In an embodiment, the proppant may comprise any suitable granular material, which may be used to prop fractures open, i.e., a propping agent or a proppant.

Nonlimiting examples of proppants suitable for use in this disclosure include silica (sand), graded sand, Ottawa sands, Brady sands, Colorado sands; resin-coated sands; gravels; synthetic organic particles, nylon pellets, high density plastics, teflons, polytetrafluoroethylenes, rubbers, resins; ceramics, aluminosilicates; glass; sintered bauxite; quartz; aluminum pellets; ground or crushed shells of nuts, walnuts, pecans, almonds, ivory nuts, brazil nuts, and the like; ground or crushed seed shells (including fruit pits) of seeds of fruits, plums, peaches, cherries, apricots, and the like; ground or crushed seed shells of other plants (e.g., maize, corn cobs or corn kernels); crushed fruit pits or processed wood materials, materials derived from woods, oak, hickory, walnut, poplar, mahogany, and the like, including such woods that have been processed by grinding, chipping, or other form of particleization; resin coated materials of the type described herein; or combinations thereof. In an embodiment, the proppant comprises sand.

In an embodiment, the particulate material comprises a gravel, which may form a gravel pack when placed in the wellbore and/or subterranean formation. A "gravel pack" is a term commonly used to refer to a volume of particulate materials (such as gravel and/or sand) placed into a wellbore to at least partially reduce the migration of unconsolidated formation particulates into the wellbore. In an embodiment, the gravel pack comprises a proppant material of the type previously described herein.

The particulate materials may be of any suitable size and/or shape. In an embodiment, a particulate material suitable for use in the present disclosure may have an average particle size in the range of from about 2 to about 400 mesh, alternatively from about 8 to about 100 mesh, or alternatively from about 10 to about 70 mesh, U.S. Sieve Series.

In an embodiment, the particulate material may be included within the WSF in a suitable amount. In an embodiment, the particulate material may be present within the WSF in an amount of from about 0.1 pounds per gallon (ppg) to about 28 ppg, alternatively from about 0.1 ppg to about 14 ppg, or alternatively from about 0.1 ppg to about 8 ppg, based on the total volume of the WSF.

In an embodiment, the WSF comprises an aqueous base fluid. Aqueous base fluids that may be used in the WSF include any aqueous fluid suitable for use in subterranean applications, provided that the aqueous base fluid is compatible with the macromolecular surfactant used in the WSF. For example, the WSF may comprise water or a brine. In an embodiment, the base fluid comprises an aqueous brine. In such an embodiment, the aqueous brine generally comprises water and an inorganic monovalent salt, an inorganic multivalent salt, or both. The aqueous brine may be naturally occurring or artificially-created. Water present in the brine may be from any suitable source, examples of which include, but are not limited to, sea water, tap water, freshwater, water that is potable or non-potable, untreated water, partially treated water, treated water, produced water, city water, well-water, surface water, or combinations thereof. The salt or salts in the water may be present in an amount ranging from greater than about 0% by weight to a saturated salt solution, alternatively from about 1 wt. % to about 18 wt. %, or alternatively from about 2 wt. % to about 7 wt. %, by weight of the aqueous fluid. In an embodiment, the salt or salts in the water may be present within the base fluid in an amount sufficient to yield a saturated brine.

Nonlimiting examples of aqueous brines suitable for use in the present disclosure include chloride-based, bromide-based, phosphate-based or formate-based brines containing monovalent and/or polyvalent cations, salts of alkali and alkaline earth metals, or combinations thereof. Additional examples of suitable brines include, but are not limited to: NaCl, KCl, NaBr, $CaCl_2$, $CaBr_2$, $ZnBr_2$, ammonium chloride ($NH_4Cl$), potassium phosphate, sodium formate, potassium formate, cesium formate, ethyl formate, methyl formate, methyl chloro formate, triethyl orthoformate, trimethyl orthoformate, or combinations thereof. In an embodiment, the aqueous fluid comprises a brine. The brine may be present in an amount of from about 40 wt. % to about 99 wt. %, alternatively from about 50 wt. % to about 95 wt. %, or alternatively from about 60 wt. % to about 90 wt. %, based on the total weight of the WSF. Alternatively, the aqueous base fluid may comprise the balance of the WSF after considering the amount of the other components used.

In an embodiment, the WSF comprises an oleaginous fluid. The oleaginous fluid may form an oil-in-water emulsion with the aqueous base fluid present in the WSF, as will be described later herein. Nonlimiting examples of oleaginous fluids suitable for use in the present disclosure include petroleum oils, natural oils, synthetically-derived oils, diesel oil, fuel oil, kerosene oil, mixtures of crude oil, mineral oil, synthetic oil, vegetable oils, olefins, polyolefins, alpha-olefins, internal olefins, polydiorganosiloxanes, acetals, esters, diesters of carbonic acid, linear or branched paraffins, or combinations thereof.

Commercial examples of oleaginous fluids suitable for use in this disclosure include without limitation PETROFREE base fluid, which is a synthetic 100% ester base fluid and, XP-07 synthetic paraffin base fluid, which is a pure normal alkane mixture, both of which are available from Halliburton Energy Services, Inc.; SHELL SARALINE 185V which is a synthetic drilling base fluid commercially available from Shell; EDC 99-DW which is a hydrocarbon commercially available from TOTAL Petrochemicals; ESCAID 110 hydrocarbon fluid is a petroleum distillate commercially available from EXXON-MOBIL Corp; BAROID ALKANE paraffin-based synthetic fluid, which is a base oil and LCA-1 paraffinic solvent, which is a paraffin-based solvent, both of which are commercially available from Halliburton Energy Services, Inc.

In an embodiment, the oleaginous fluid may be included within the WSF in a suitable amount. In an embodiment, the oleaginous fluid is present within the WSF in an amount of from about 0.01 wt. % to about 10 wt. %, alternatively from about 0.1 wt. % to about 8 wt. %, or alternatively from about 0.5 wt. % to about 5 wt. %, based on the total weight of the WSF.

In an embodiment, the WSF comprises a macromolecular surfactant. In an embodiment, the macromolecular surfactant may function as an emulsifier to stabilize an oil-in-water emulsion of the oleaginous fluid and the aqueous base fluid, which oil-in-water emulsion could be used to suspend and transport the particulate material to a desired location in the wellbore and/or subterranean formation.

In an embodiment, the macromolecular surfactant comprises a hydrophobically modified nitrogen-containing polymer. Herein the disclosure may refer to a polymer and/or a polymeric material. It is to be understood that the terms polymer and/or polymeric material herein are used interchangeably and are meant to each refer to compositions comprising at least one polymerized monomer in the presence or absence of other additives traditionally included in such materials. Examples of polymeric materials suitable for use as part of the macromolecular surfactant include, but are not limited to homopolymers, random, block, graft, star- and hyper-branched polyesters, copolymers thereof, derivatives thereof, or combinations thereof. The term "derivative" herein is defined to include any compound that is made from one or more of the hydrophobically modified nitrogen-containing polymers, for example, by replacing one atom in the hydrophobically modified nitrogen-containing polymer with another atom or group of atoms, rearranging two or more atoms in the hydrophobically modified nitrogen-containing polymer, ionizing one of the hydrophobically modified nitrogen-containing polymers, or creating a salt of one of the hydrophobically modified nitrogen-containing polymers. The term "copolymer" as used herein is not limited to the combination of two polymers, but includes any combination of any number of polymers, e.g., graft polymers, terpolymers, and the like.

As used herein, the term "hydrophobically modified," or "hydrophobic modification," refers to the incorporation into a nitrogen-containing polymer structure of hydrophobic groups. As used herein, the term "hydrophobically modified," or "hydrophobic modification," refers to the incorporation into the nitrogen-containing polymer structure of hydrophobic groups comprising alkyl chain groups with a length of from about 2 to about 26 carbons, alternatively from about 10 to about 22 carbons, or alternatively from about 12 to about 18 carbons. While these hydrophobically modified nitrogen-containing polymers have hydrophobic groups incorporated into the nitrogen-containing polymer structure, the hydrophobically modified nitrogen-containing polymers suitable for use in the present disclosure are water-soluble. As used herein, "water-soluble" refers to equal to or greater than about 0.0001 wt. %, alternatively equal to or greater than about 0.001 wt. %, alternatively equal to or greater than about 0.01 wt. %, alternatively equal to or greater than about 0.1 wt. %, or alternatively equal to or greater than about 1 wt. % solubility in distilled water at room temperature.

In an embodiment, the hydrophobically modified nitrogen-containing polymer comprises a nitrogen-containing functional group capable of reacting with an alkylating agent. Nonlimiting examples of nitrogen-containing functional groups suitable for use in the present disclosure include an amine functional group, a primary amine functional group, a secondary amine functional group, a tertiary amine functional group, a quaternary ammonium salt functional group, an amide functional group, a carboxamide functional group, an imide functional group, an imine functional group, a primary ketimine functional group, a secondary ketimine functional group, a primary aldimine functional group, a secondary aldimine functional group, a cyanate functional group, an isocyanate functional group, a nitrile functional group, an isonitrile functional group, or combinations thereof.

The hydrophobically modified nitrogen-containing polymers may be synthesized using any suitable method. In an embodiment, the hydrophobically modified nitrogen-containing polymers may be a reaction product of a nitrogen-containing polymer and a hydrophobic compound, i.e., hydrophobic modification. In an embodiment, the hydrophobically modified nitrogen-containing polymers may be prepared by amidation of nitrogen-containing polymers with a carboxylic acid, such as for example an amidation reaction of a polyethyleneimine with a carboxylic acid (e.g., a fatty acid). In some embodiments, the hydrophobically modified nitrogen-containing polymers may be prepared by nitrogen alkylation of nitrogen-containing polymers with an alkyl halide, such as for example a primary, secondary or tertiary amine nitrogen alkylation reaction of a polyethyleneimine with an alkyl halide. In an alternative embodiment, the hydrophobically modified nitrogen-containing polymers may be prepared by quaternization of nitrogen-containing polymers with an alkyl halide, such as for example a tertiary amine nitrogen alkylation reaction of a polyethyleneimine with an alkyl halide. In other embodiments, the hydrophobically modified nitrogen-containing polymers may be prepared by a reaction involving a nucleophilic attack, such as for example a nitrogen of the nitrogen-containing polymers nucleophilically attacking an unsaturated bond (e.g., an alpha olefin), an epoxide, an ester, and the like, or combinations thereof, of the hydrophobic compound. In yet another embodiment, the hydrophobically modified nitrogen-containing polymers may be prepared by an addition reaction of a polyethyleneimine to an alpha olefin (e.g., a long alkyl chain alpha olefin). In still yet another embodiment, the hydrophobically modified nitrogen-containing polymers may be prepared by a reaction of a polyethyleneimine with an alkyl chain terminal epoxide compound (e.g., a long alkyl chain terminal epoxide). Those of ordinary skill in the art, with the benefit of this disclosure, will be able to determine other suitable methods for the preparation of suitable hydrophobically modified nitrogen-containing polymers.

In an embodiment, the nitrogen-containing polymers suitable for use in this disclosure (e.g., suitable for a hydrophobic modification process) comprise polyethyleneimine polymers, acrylamide based polymers, hydrolyzed polyacrylamides, polyvinylamines, poly(vinylamines/vinyl alcohols), alkylamino acrylate polymers, alkylamino alkylacrylate polymers, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), and poly(methacrylic acid/dimethylaminopropyl methacrylamide), or combinations thereof.

In some embodiments, the nitrogen-containing polymers may comprise a polymer backbone that contains a reactive amino group in the polymer backbone or as a pendant group, wherein the reactive amino group is capable of reacting with a hydrophobic compound. In other embodiments, the nitrogen-containing polymer comprises a dialkyl amino pendant group. In other embodiments, the nitrogen-containing polymer may comprise a pendant group that comprises a dimethyl amino group, e.g., polymers comprising dimethylaminoethyl methacrylate or dimethylaminopropyl methacrylamide monomers. In some embodiments, a suitable nitrogen-containing polymer may be formed from monomers containing amine groups in an amount ranging from about 20 mole % to about 100 mole % of the monomers, alternatively from about 40 mole % to about 80 mole % of the monomers, or alternatively from about 50 mole % to about 75 mole % of the monomers.

In certain embodiments, a suitable nitrogen-containing polymer may comprise a polymer backbone comprising polar heteroatoms, such as for example oxygen, nitrogen, sulfur, phosphorous, or combinations thereof. Nonlimiting examples of the nitrogen-containing polymers comprising polar heteroatoms within the polymer backbone suitable for use in the present disclosure include chitosans, polyimines, polyamines, polyimides, polyamides, polyetheramines, polyethyleneimines, polyhydroxyetheramines, polylysines, derivatives thereof, or combinations thereof.

In an embodiment, hydrophobic compounds suitable for reacting with the nitrogen-containing polymers comprise alcohols; amines; epoxides; alkyl halides; alkyl sulfonates; alkyl sulfates; organic acids, fatty acids, such as for example octenyl succinic acid, dodecenyl succinic acid, and tallow based fatty acids; organic acid derivatives, such as for example anhydrides thereof, esters thereof, imides thereof, amides thereof, acid halides thereof; or combinations thereof. In some embodiments, the hydrophobic compounds comprise alkyl groups with a chain length ranging from about 2 to about 26 carbon atoms, alternatively from about 10 to about 22 carbons, or alternatively from about 12 to about 18 carbons.

When the hydrophobic compound is an alkyl halide, for example, the reaction between the hydrophobic compound and the nitrogen-containing polymers comprising amino groups may result in the quaternization of at least some of the nitrogen-containing polymers amino groups, wherein the alkyl chain length is from about 2 to about 26 carbons, alternatively from about 10 to about 22 carbons, or alternatively from about 12 to about 18 carbons.

In an embodiment, the hydrophobically modified nitrogen-containing polymer comprises a nitrogen-containing monomer and a hydrophobic compound of the type described previously herein in a mole ratio ranging from about 99.98:0.02 to about 90:10 (nitrogen-containing monomer to hydrophobic compound), alternatively from about 80 to about 20, or alternatively from about 70 to about 30, wherein the nitrogen-containing monomer is a calculated amount present in the nitrogen-containing polymer.

Nonlimiting examples of nitrogen-containing monomers suitable for use in the present disclosure include aziridine, acrylamide, 2-acrylamido-2-methyl propane sulfonic acid, N,N-dimethylacrylamide, vinyl pyrrolidone, dimethylaminoethyl methacrylate, dimethylaminoethyl methacrylamide, dimethylaminopropyl methacrylamide, vinyl amine, trimethylammoniumethyl methacrylate chloride, methacrylamide, alkyl amino methacrylate, N-hydroxymethylacrylamide, N-hydroxymethylmethacrylamide, vinyl caprolactam, N-vinylformamide, quaternary amine salt derivatives of acrylamide, quaternary amine salt derivatives of acrylic acid, methacrylamidoethyltrimethyl ammonium halide, N,N-diallylacetamide, dimethyldiallyl ammonium halide, or combinations thereof. For purposes of this disclosure herein, a halide may comprise chloride, bromide, iodide, or a halide equivalent, such as for example toluenesulfonate (i.e., tosylate) or methanesulfonate (i.e., mesylate), or combinations thereof.

In an embodiment, the hydrophobically modified nitrogen-containing polymer may be prepared from a polymerization reaction comprising a nitrogen-containing monomer and/or a hydrophobically modified nitrogen-containing monomer. Those of ordinary skill in the art, with the benefit of this disclosure, will be able to determine other suitable methods for the synthesis of suitable hydrophobically modified nitrogen-containing polymers. The hydrophobically modified nitrogen-containing monomer may be a reaction product of a nitrogen-containing monomer and a hydrophobic compound of the type previously described herein. In an embodiment, the hydrophobically modified nitrogen-containing monomers comprise alkyl aziridines, alkyl acrylamides, alkyl methacrylamides, alkyl dimethylammoniumethyl methacrylate halides, alkyl dimethylammoniumethyl methacrylamide halides, alkyl dimethylammoniumpropyl methacrylate halides, alkyl dimethylammoniumpropyl methacrylamide halides, or combinations thereof. In such embodiment, the alkyl groups comprise from about 2 to about 26 carbon atoms, alternatively from about 10 to about 22 carbons, or alternatively from about 12 to about 18 carbons. In an embodiment, the hydrophobically modified nitrogen-containing monomer comprises octadecyldimethylammoniumethyl methacrylate bromide, hexadecyldimethylammoniumethyl methacrylate bromide, octadecyldimethylammoniumethyl methacrylamide bromide, hexadecyldimethyl-ammoniumpropyl methacrylamide bromide, octadecyl methacrylamide, hexadecyl methacrylamide, or combinations thereof.

In an embodiment, the hydrophobically modified nitrogen-containing polymer comprises a hydrophobically modified polyethyleneimine, a hydrophobically modified polyimine, a hydrophobically modified polyimide, a hydrophobically modified polyamine, a hydrophobically modified polyamide, a hydrophobically modified chitosan, a hydrophobically modified polyetheramine, a hydrophobically modified polyhydroxyetheramine, a hydrophobically modified polylysine, or combinations thereof.

In an embodiment, the hydrophobically modified polyethyleneimine comprises a compound characterized by Structure I:

Structure I

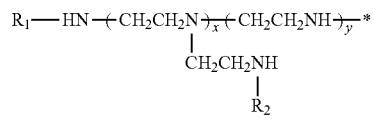

wherein $R_1$ and $R_2$ can each independently be hydrogen, a $C_2$-$C_{26}$ alkyl group, a $C_4$-$C_{28}$ fatty acid, or combinations thereof; the repeating ethyleneimine (—CH$_2$CH$_2$N—) unit may occur x times with the value of x ranging from about 2 to about 30,000, alternatively from about 1,000 to about 30,000, alternatively from about 5,000 to about 20,000, or alternatively from about 2 to about 1,000; the repeating ethyleneimine (—CH$_2$CH$_2$NH—) unit may occur y times with the value of y ranging from about 2 to about 30,000, alternatively from about 1,000 to about 30,000, alternatively from about 5,000 to about 20,000, or alternatively from about 2 to about 1,000; and "*" represents the remainder of the polymer molecule.

In an embodiment, the hydrophobically modified nitrogen-containing polymer comprises hydrophobically modified polyethyleneimine, hydrophobically modified poly(dimethylaminoethyl methacrylate), hydrophobically modified poly(dimethylaminopropyl methacrylamide), poly(alkyldimethylammoniumethyl methacrylate), poly(octadecyldimethylammoniumethyl methacrylate), poly(hexadecyldimethylammoniumethyl methacrylate), poly(octadecyldimethylammoniumethyl methacrylamide), poly(hexadecyldimethyl-ammoniumpropyl methacrylamide), acrylamide/octadecyldimethylammoniumethyl methacrylate bromide copolymer, dimethylaminoethyl methacrylate/vinyl pyrrolidone/hexadecyldimethylammoniumethyl methacrylate bromide terpolymer, acrylamide/2-acrylamido-2-methyl propane sulfonic acid/2-ethylhexyl methacrylate terpolymer, amino methacrylate/alkyl amino methacrylate copolymer, dimethylaminoethyl methacrylate/alkyl-dimethylammoniumethyl methacrylate copolymer, dimethylaminoethyl methacrylate/hexadecyldimethylammoniumethyl methacrylate copolymer, dimethylaminoethyl methacrylate/hexadecyldimethylammoniumethyl methacrylate bromide copolymer, dimethylammoniumethyl methacrylate/cetyldimethylammoniumethyl methacrylate copolymer, dimethylaminoethyl acrylate/acrylate/alkyldimethylammoniumethyl acrylate copolymer, or combinations thereof.

In an embodiment, a macromolecular surfactant suitable for use in the present disclosure may be characterized by a weight average molecular weight (M$_w$) of from about 300 Da to about 4,000,000 Da, alternatively from about 400 Da to about 50,000 Da, alternatively from about 1,000 Da to about 30,000 Da, or alternatively from about 2,500 Da to about 15,000 Da.

In an embodiment, the macromolecular surfactant may be included within the WSF in a suitable or effective amount (e.g., an amount effective to stabilize an oil-in-water emulsion of the oleaginous fluid and the aqueous base fluid). The resultant concentration and/or amount of macromolecular surfactant that is necessary to stabilize the oil-in-water emulsion (e.g., oleaginous fluid and aqueous base fluid emulsion) to suspend and transport the particulate material may be dependent upon a variety of factors such as the composition of the WSF; the type of aqueous base fluid; the type of oleaginous fluid; the type of particulate material; the presence or absence of various additives; the intended wellbore location where the WSF is expected to transport and then release the particulate material; the temperature of the operational environment (e.g., the wellbore); the composition of the formation; the pressure of the formation; the diameter of the hole; the particular macromolecular surfactant used; or combinations thereof. In an embodiment, a macromolecular surfactant of the type disclosed herein may be present within the WSF in an amount of from about 0.05 wt. % to about 5 wt. %, alternatively from about 0.1 wt. % to about 5 wt. %, alternatively from about 1 wt. % to about 5 wt. %, or alternatively from about 0.05 wt. % to about 1 wt. %, based on the total weight of the WSF.

The WSF may further comprise additional additives as deemed appropriate for improving the properties of the fluid. Such additives may vary depending on the intended use of the fluid in the wellbore. Examples of such additives include, but are not limited to coupling agents, silane coupling agents, conventional surfactants, conventional emulsifiers, dispersants, flocculants, pH adjusting agents, bases, acids, mutual solvents, corrosion inhibitors, relative permeability modifiers, lime, weighting agents, glass fibers, carbon fibers, conditioning agents, water softeners, foaming agents, salts, oxidation inhibitors, scale inhibitors, thinners, scavengers, gas scavengers, lubricants, friction reducers, antifoam agents, bridging agents, viscosifying agents, viscosifiers, gelling agents, suspending agents, clays, clay control agents, fluid loss additives, and the like, or combinations thereof. These additives may be introduced singularly or in combination using any suitable methodology and in amounts effective to produce the desired improvements in fluid properties. As will appreciated by one of skill in the art with the help of this disclosure, any of the components and/or additives used in the WSF have to be compatible with the macromolecular surfactant used in the WSF composition.

In an embodiment, the WSF is substantially free of a crosslinker, for example the WSF comprises less than about 1 wt. %, alternatively less than about 0.1 wt. %, alternatively less than about 0.01 wt. %, or alternatively less than about 0.001 wt. % crosslinker.

In an embodiment, the WSF is substantially free of a pH buffering agent, for example the WSF comprises less than about 1 wt. %, alternatively less than about 0.1 wt. %, alternatively less than about 0.01 wt. %, or alternatively less than about 0.001 wt. % pH buffering agent.

In an embodiment, the WSF is substantially free of a breaker or breaking agent, for example the WSF comprises less than about 1 wt. %, alternatively less than about 0.1 wt. %, alternatively less than about 0.01 wt. %, or alternatively less than about 0.001 wt. % breaker.

In an embodiment, the WSF further comprises a coupling agent. In an embodiment, the coupling agent is a multifunctional compound comprising two or more reactive moieties that can form covalent bonds with other molecules. Alternatively, in an embodiment, the coupling agent is a bifunctional compound comprising two reactive moieties that can form covalent bonds with other molecules. In an embodiment, a coupling agent suitable for use in the present disclosure is able to covalently bond to both the surface of the particulate material and to the macromolecular surfactant.

In an embodiment, the coupling agent comprises silanes, vinyl silanes, epoxy silanes, amino silanes, sulfur silanes, ureido silanes, isocyanate silanes, mercapto silanes, methacryloxy silanes, chloro silanes, alkyl silanes, alkoxy silanes, oximino silanes, acetoxy silanes, phenyl silanes, silazanes, siloxanes, silanols, or combinations thereof.

Nonlimiting examples of vinyl silanes suitable for use in the present disclosure include vinyl silane, vinyltrichlorosilane, vinyltrimethoxysilane, vinyltriethoxysilane, vinyltris(2-methoxyethoxy)silane, vinyltrisisopropoxysilane, vinyltris(t-butylperoxy)silane, vinyldimethylchlorosilane, vinyldimethylethoxysilane, vinylmethyldichlorosilane, vinylmethyldimethoxysilane, vinylmethyldiethoxysilane, methylvinyldi(N-methylacetylamido)silane, methylvinyldi(5-caprolactam)silane, bis(methyldichlorosilyl)ethane, 2,4,6,8-tetramethyl-2,4,6,8-tetravinyl-cyclotetrasiloxane, 1,3,5-trivinyl-1,3,5-trimethylcyclotrisiloxane, or combinations thereof.

Nonlimiting examples of epoxy silanes suitable for use in the present disclosure include 3-glycidoxypropyltrimethoxysilane, 3-glycidoxypropyltriethoxysilane, 3-glycidoxypropyl-methyldiethoxysilane, 3-glycidoxypropylmethyldimethoxysilane, 2-(3,4-epoxycyclohexyl)-ethyltrimethoxysilane, 2-(3,4-epoxycyclohexyl)-ethyltriethoxysilane, or combinations thereof.

Nonlimiting examples of amino silanes suitable for use in the present disclosure include N-(3-triethoxysilylpropyl) amine, 3-aminopropylsilanetriol, bis[(3-triethoxysilyl)propyl]amine, N-(3-trimethoxysilylpropyl)amine, bis[(3-trimethoxysilyl)propyl]amine, N-(3-methyldimethoxysilylpropyl)amine, 3-methyldimethoxysilylpropylamine, N-(2-aminoethyl)-3-aminopropyl-trimethoxysilane, N-(2-aminoethyl)-3-aminopropyltriethoxysilane, N-(2-aminoethyl)-3-aminopropylmethyldimethoxysilane, N-(3-trimethoxysilylpropyl)diethylenetriamine, N-(3-methyldimethoxysilylpropyl)diethylenetriamine, methyldimethoxysilylpropylpiperazine, N-3-(trimethoxysilyl)-propylcyclohexylamine, N-3-(methyldimethoxysilyl)-propylcyclohexylamine, N-(trimethoxysilylmethyl)aniline, N-(triethoxysilylmethyl)aniline, N-(3-trimethoxysilyl-propyl)aniline, N-(3-triethoxysilylpropyl)aniline, diethylaminomethyltriethoxysilane, diethyl-aminomethylmethyldiethoxysilane, 3-(trimethoxysilylpropyl)diethylamine, 3-(N,N-dimethylaminopropyl)-aminopropyl-methyldimethoxysilane, or combinations thereof.

In an embodiment a coupling agent of the type disclosed herein may be present in the WSF in an amount of from about 0.01 wt. % to about 10 wt. %, alternatively from about 0.1 wt. % to about 5 wt. %, or alternatively from about 0.5 wt. % to about 2 wt. %, based on the total weight of the WSF.

In an embodiment, the WSF comprises a particulate material, an aqueous base fluid, an oleaginous fluid, and a macromolecular surfactant, wherein the components are combined to form an oil-in-water emulsion suspending the particulate material throughout. For example, the WSF may comprise 2 ppg sand, 1 wt. % crude oil, 0.4 wt. % hydrophobically modified polyethyleneimine, and the balance comprises a KCl brine, based on the total weight of the WSF. The polyethyleneimine was hydrophobically modified with a $C_{12}$-$C_{18}$ alkyl chain.

In an embodiment, the WSF comprises a particulate material, an aqueous base fluid, an oleaginous fluid, and a macromolecular surfactant, wherein the components are combined to form an oil-in-water emulsion suspending the particulate material throughout. For example, the WSF may comprise 2 ppg sand, 1.1 wt. % LCA-1 paraffinic solvent, 0.44 wt. % hydrophobically modified polyethyleneimine, and the balance comprises water, based on the total weight of the WSF. The hydrophobically modified polyethyleneimine is a compound characterized by Structure I, wherein x is 5, y is 10, $R_1$ is a $C_{16}$-$C_{18}$ fatty acid, and $R_2$ is $C_{16}$-$C_{18}$ fatty acid.

In an embodiment, the WSF comprises a particulate material, an aqueous base fluid, an oleaginous fluid, a macromolecular surfactant, and a coupling agent, wherein the components are combined to form an oil-in-water emulsion suspending the particulate material throughout. For example, the WSF may comprise 4 ppg sand, 1 wt. % LCA-1 paraffinic solvent, 0.4 wt. % hydrophobically modified polyethyleneimine, 0.1 wt. % N-(3-triethoxysilylpropyl)amine, and the balance comprises water, based on the total weight of the WSF. The hydrophobically modified polyethyleneimine is a compound characterized by Structure I, wherein x is 5, y is 10, $R_1$ is $C_{16}$-$C_{18}$ fatty acid, and $R_2$ is $C_{16}$-$C_{18}$ fatty acid.

In an embodiment, the WSF composition comprising a macromolecular surfactant may be prepared using any suitable method or process. The components of the WSF (e.g., particulate material, aqueous base fluid, oleaginous fluid, macromolecular surfactant, optional coupling agent, etc.) may be combined and mixed in by using any mixing device compatible with the composition, e.g., a mixer, a blender, or by vigorous shaking, etc.

A particulate material, an oleaginous fluid, optional coupling agent, and a macromolecular surfactant of the type disclosed herein may be included in any suitable wellbore servicing fluid (WSF). As used herein, a "servicing fluid" or "treatment fluid" refers generally to any fluid that may be used in a subterranean application in conjunction with a desired function and/or for a desired purpose, including but not limited to fluids used to drill, complete, work over, fracture, repair, or in any way prepare a wellbore for the recovery of materials residing in a subterranean formation penetrated by the wellbore. Examples of wellbore servicing fluids include, but are not limited to fracturing fluids, gravel packing fluids, diverting fluids, completion fluids, washing fluids, sweeping fluids, acidizing fluids, cement slurries, drilling fluids or muds, spacer fluids, lost circulation fluids. The servicing fluid is for use in a wellbore that penetrates a subterranean formation. It is to be understood that "subterranean formation" encompasses both areas below exposed earth and areas below earth covered by water such as ocean or fresh water.

In an embodiment, the components of the WSF are combined at the well site; alternatively, the components of the WSF are combined off-site and are transported to and used at the well site. In an embodiment, additional surfactants (e.g., conventional surfactants, conventional emulsifiers, etc.) may be added to the WSF on-the-fly (e.g., in real time or on-location) along with the other components/additives. The resulting WSF may be pumped downhole where the particulate material of the WSF may function as intended (e.g., consolidate and/or enhance the conductivity of at least a portion of the wellbore and/or subterranean formation).

In an embodiment, the macromolecular surfactant is manufactured off-site. In another embodiment, the macromolecular surfactant is manufactured on-the-fly. When manufactured or assembled off-site, the macromolecular surfactant may be transported to (and, if necessary, stored at) the on-site location and combined with the other components to form a WSF.

In various embodiments, the particulate material (e.g., proppant, gravel, etc.) may be pre-contacted and/or pre-coated with one or more components of the WSF (e.g., a macromolecular surfactant and/or an optional coupling agent of the type disclosed herein) prior to being placed into the wellbore, for example to form a coated particulate material (e.g., macromolecular surfactant coated sand, coupling agent coated sand, or combinations thereof). In such embodiments, the particulate material (e.g., proppant, gravel, etc.) may be pre-contacted and/or pre-coated with one or more components of the WSF (e.g., a macromolecular surfactant and/or an optional coupling agent of the type disclosed herein) off-site, alternatively on-the-fly at a job site, or combinations thereof. When the particulate material (e.g., proppant, gravel, etc.) is pre-contacted and/or pre-coated with one or more components of the WSF (e.g., a macromolecular surfactant and/or an optional coupling agent of the type disclosed herein) off-site, such coated particulate material may be transported to the well site where it may be contacted with the other components of the WSF (e.g., oleaginous fluid, aqueous base fluid, etc.). WSF compositions comprising particulate materials, aqueous base fluid, oleaginous fluid, macromolecular surfactant, optional coupling agent, and optional additives may be prepared using any suitable methodology. For example, the components (e.g., particulate materials, aqueous base fluid, oleaginous fluid, macromolecular surfactant, optional coupling agent, etc.) may be mixed in a blender or a mixer. In an embodiment, the particulate material (e.g., proppant, gravel, etc.) may be pre-contacted and/or pre-coated with a macromolecular surfactant of the type disclosed herein. In another embodiment, the particulate material (e.g., proppant, gravel, etc.) may be pre-contacted and/or pre-coated with a coupling agent of the type disclosed herein. In yet another embodiment, the particulate material (e.g., proppant, gravel, etc.) may be pre-contacted and/or pre-coated with a macromolecular surfactant and a coupling agent of the type disclosed herein.

In some embodiments, the macromolecular surfactant may be mixed with at least a portion of the oleaginous fluid and used as a macromolecular surfactant liquid additive (MSLA). For example, the macromolecular surfactant and the oleaginous fluid may be mixed in a blender or a mixer to form the MSLA. In an embodiment, the MSLA is manufactured off-site. In another embodiment, the MSLA is manufactured on-the-fly. When manufactured or assembled off-site, the MSLA may be transported to (and, if necessary, stored at) the on-site location and combined with the other components to form a WSF.

In an embodiment, the MSLA is mixed with additional oleaginous fluid and/or aqueous base fluid to form a diluted additive, which is subsequently added to a WSF. In an embodiment, the MSLA in the form of a liquid additive or diluted liquid additive is injected into a delivery pump being used to supply the aqueous base fluid to a WSF composition. In such embodiment, the liquid additive or diluted liquid additive may be injected into the suction of the pump. As such, the aqueous base fluid (e.g., the pumped aqueous base fluid) and the additional oleaginous fluid and/or aqueous base fluid (e.g., as part of the liquid additive or the diluted liquid additive) are all available to the WSF composition to form an oil-in-water emulsion to suspend and transport the particulate material to a desired location in the wellbore and/or subterranean formation. In such embodiments, the MSLA can be added at a controlled/metered rate to the aqueous base fluid or WSF using a continuous metering system (CMS) unit. The CMS unit can also be employed to control the rate at which the additional oleaginous fluid and/or aqueous base fluid is introduced to the WSF as well as the rate at which any other optional additives are introduced to the aqueous base fluid or WSF. As such, the CMS unit can be used to achieve an accurate and precise ratio of water to macromolecular surfactant to oleaginous fluid concentration in the WSF such that the properties of the WSF (e.g., density, viscosity), are suitable for suspending the particulate material given the downhole conditions of the wellbore (e.g., pressure, temperature, etc.). The concentrations of the components in the WSF, e.g., the macromolecular surfactant, can be adjusted to their desired amounts before delivering the WSF composition into the wellbore. Those concentrations thus are not limited to the original design specification of the WSF composition and can be varied to account for changes in the downhole conditions of the wellbore that may occur before the composition is actually pumped into the wellbore.

In an embodiment, the macromolecular surfactant, the oleaginous fluid and the aqueous base fluid are contacted together prior to the addition of the particulate material. In such embodiment, the macromolecular surfactant, the oleaginous fluid and the aqueous base fluid may be mixed together to form an oil-in-water emulsion prior to, concurrent with, and/or subsequent to the addition of particulate material to the WSF. In an embodiment, the macromolecular surfactant, the oleaginous fluid and the aqueous base fluid are mixed together to form an oil-in-water emulsion and then the particulate material is added and mixed into the oil-in-water emulsion to form the WSF. In another embodiment, the macromolecular surfactant, the oleaginous fluid and the aqueous base fluid are contacted together and then mixed to form the oil-in-water emulsion while the particulate material is added to the WSF. In yet another embodiment, the macromolecular surfactant, the oleaginous fluid, the aqueous base fluid, and the particulate material are contacted together and then mixed to form the oil-in-water emulsion.

In an embodiment, the WSF comprises an oil-in-water emulsion that can suspend and transport the particulate material to a desired location in a wellbore and/or subterranean formation. Generally, an emulsion forms when two or more immiscible liquids are mixed together. However, emulsions are not inherently stable, and surfactants or emulsifiers can be added to an emulsion to stabilize it. Generally, a surfactant or emulsifier (e.g., a macromolecular surfactant) is a compound that aids in the forming of an emulsion (i.e., a mixture of two or more liquids that are normally immiscible) by decreasing the interfacial tension between immiscible liquids (e.g., oleaginous fluid and aqueous base fluid); or a compound that stabilizes an already existing emulsion by decreasing the separation tendency of the liquids; or both. The immiscible liquids form a continuous phase and a discontinuous phase, wherein the discontinuous phase is dispersed throughout the continuous phase. An oil-in-water emulsion (e.g., an oil-in-water emulsion of an oleaginous fluid and an aqueous base fluid) comprises oil (e.g., oleaginous fluid) as the discontinuous phase, and water (e.g., an aqueous base fluid) as the continuous phase, wherein the oil (e.g., oleaginous fluid) discontinuous phase is dispersed throughout the water (e.g., an aqueous base fluid) continuous phase.

Without wishing to be limited by theory, the oil-in-water emulsion of the WSF has a three dimensional network or a higher-order structure, which structure occurs due to the large size of the macromolecular surfactant molecules. For example, the three dimensional oil-in-water emulsion network of the WSF may comprise a micelle structure and/or lamellar structure where the macromolecular surfactant forms elongated sheets of surfactant molecules, which sheets may facilitate trapping the particulate material through interactions between the macromolecular surfactant and the surface of the particulate material. Further, without wishing to be limited by theory, the macromolecular surfactant adheres to the surface of the particulate material, either by non-covalent interactions (e.g., van der Waals interactions, electrostatic interactions, etc.) or covalent interactions (e.g., covalent bonding) between the nitrogen-containing functional group of the macromolecular surfactant and the surface of the particulate material.

In an embodiment, the oil-in-water emulsion of the WSF comprising a particulate material may be characterized by a particulate material settling velocity of from about $10^{-10}$ m/s to about $10^{-2}$ m/s, alternatively from about $10^{-9}$ m/s to about $10^{-3}$ m/s, or alternatively from about $10^{-8}$ m/s to about $10^{-4}$ m/s. The particulate material settling velocity refers to rate at which the particulate material falls or travels through the wellbore servicing fluid emulsion under static conditions, for example when the wellbore servicing fluid is stationary, and it may be measured by using settling columns.

In an embodiment, the WSF is an aqueous based fracturing fluid (e.g., an oil-in-water emulsion) comprising a macromolecular surfactant, an aqueous fluid, an oleaginous fluid, a particulate material (e.g., a proppant), and an optional coupling agent. In another embodiment, the WSF is an aqueous based gravel packing fluid (e.g., an oil-in-water emulsion) comprising a macromolecular surfactant, an aqueous fluid, an oleaginous fluid, a particulate material (e.g., a gravel), and an optional coupling agent.

In an embodiment, the wellbore service being performed is a fracturing operation, such as for example hydraulic fracturing and/or frac-packing, wherein a WSF is placed (e.g., pumped downhole) in the formation. In such embodiment, the WSF is a fracturing fluid. As will be understood by one of ordinary skill in the art, the particular composition of a fracturing fluid will be dependent on the type of formation that is to be fractured. Fracturing fluids, in addition to a macromolecular surfactant and an oleaginous fluid, typically comprise an aqueous fluid (e.g., water), a conventional surfactant, a proppant, acid, friction reducers, gelling agents, scale inhibitors, pH-adjusting agents, oxygen scavengers, iron-control agents, corrosion inhibitors, bactericides, and the like.

In an embodiment, the fracturing fluid comprises a particulate material comprising proppant of the type previously described herein. When deposited in a fracture, the proppant may form a proppant pack, resulting in conductive channels (e.g., flow channel spaces) through which fluids may flow to the wellbore. The proppant functions to prevent the fractures from closing due to overburden pressures.

In an embodiment, the wellbore service being performed is a gravel packing operation, wherein a WSF comprising a particulate material (e.g., gravel) is placed (e.g., pumped downhole) in the formation. In such embodiment, the WSF is a gravel packing fluid. Gravel packing operations commonly involve placing a gravel pack screen in the wellbore neighboring a desired portion of the subterranean formation, and packing the surrounding annulus between the screen and the subterranean formation with particulate materials that are sized to prevent and inhibit the passage of formation solids through the gravel pack with produced fluids. In some instances, a screenless gravel packing operation may be performed.

During well stimulation treatments, such as fracturing treatments and/or gravel packing treatments, the WSF (e.g., the fracturing fluid and/or gravel packing fluid) comprises an oil-in-water emulsion that can suspend a particulate material (e.g., proppant, gravel, etc.) and deposit the particulate material in a desired location, such as for example a fracture, inter alia, to maintain the integrity of such fracture once the hydraulic pressure is released. After the particulate material is placed in the fracture and pumping stops, the fracture closes. The pores of the particulate material bed and the surrounding formation are filled with the WSF (e.g., the fracturing fluid and/or gravel packing fluid) and should be cleaned out to maximize conductivity of the particulate material-filled space (e.g., a proppant-filled fracture, a gravel-filled fracture, or combinations thereof). Once at least one fracture is created and the particulate material (e.g., proppant, gravel, or combinations thereof) is deposited, the oil-in-water emulsion of the WSF breaks due to the elevated bottom hole temperature (BHT), thereby depositing the particulate material in the form of a particulate material pack (e.g., a proppant pack, a gravel pack, or combinations thereof) and allowing the fluid to be recovered from the wellbore and/or subterranean formation. Without wishing to be limited by theory, the elevated BHT unravels the three dimensional oil-in-water emulsion network structure of the WSF, but does not substantially detach the macromolecular surfactant from the particulate material. In an embodiment, a WSF of the type disclosed herein may be used at BHTs ranging from about 80° F. to about 300° F., alternatively from about 120° F. to about 275° F., or alternatively from about 140° F. to about 250° F.

In an embodiment, the particulate material pack (e.g., a proppant pack, a gravel pack, or combinations hereof) comprises a particulate material and at least a portion of the macromolecular surfactant that was used to stabilize the WSF oil-in-water emulsion. The macromolecular surfactant may adhere to the surface of the particulate material as previously described herein. In an embodiment, the presence of the macromolecular surfactant on the surface of the particulate material (e.g., proppant, gravel, etc.) leads to a particulate material pack (e.g., a proppant pack, a gravel pack, or combinations hereof) with an enhanced volume when compared to a particulate material pack created by the same amount of particulate material in the absence of the macromolecular surfactant. For example, if the volume of a particulate material pack lacking a macromolecular surfactant is z, then the volume of a particulate material pack comprising a macromolecular surfactant may be about 3.00z, alternatively about 1.50z, or alternatively about 1.10z. In an embodiment, the volume of the particulate material pack is from about 10% to about 300% greater, alternatively from about 50% to about 250% greater, or alternatively from about 100% to about 200% greater than the volume of a particulate material pack that would be created by the same amount of particulate material in the absence of the macromolecular surfactant.

In an embodiment, the particulate material pack (e.g., a proppant pack, a gravel pack, or combinations thereof) comprises flow channels or flow space that allow for the recovery of the natural resources (e.g., oil or gas) residing in the subterranean formation. In an embodiment, the presence of the macromolecular surfactant in the particulate material pack may increase the particulate material pack flow channel space from about 1% to about 50%, alternatively from about 5% to about 50%, alternatively from about 10% to about 25%, or alternatively from about 25% to about 50%, based on the flow space that would be created by the same amount of particulate material in the absence of the macromolecular surfactant.

In an embodiment, the particulate material pack (e.g., a proppant pack, a gravel pack, or combinations thereof) may help mitigate fines migration in a subterranean formation. Generally, fines migration may result from an unconsolidated or inherently unstable formation, or from use of an incompatible treatment fluid that liberates fine particles. In an embodiment, a particulate material pack (e.g., a proppant pack, a gravel pack, or combinations thereof) comprising a macromolecular surfactant may capture/retain at least a portion of the fines present in a subterranean formation. Without wishing to be limited by theory, the macromolecular surfactant that attaches to the particulate material surface as previously described herein has hydrophobic modifications that may interact with and retain the fines through non-covalent interactions (e.g., van der Waals interactions, electrostatic interactions, etc.). The surfaces of the particulate material pack are oil-wet, due to the presence of the hydrophobic modifications. In an embodiment, the presence of the macromolecular surfactant in the particulate material pack may increase the ability of the particulate material pack to capture fines from about 0.01% to about 100%, alternatively from about 1% to about 50%, or alternatively from about 10% to about 50%, based on the amount of fines that would be captured by the same amount of particulate material in the absence of the macromolecular surfactant.

In an embodiment, the WSF comprising a particulate material and a macromolecular surfactant and methods of using the same disclosed herein may be advantageously employed in the performance of one or more wellbore servicing operations. In an embodiment, the particulate material may be advantageously suspended in the WSF oil-in-water emulsion due to the interactions between the particulate material and the three dimensional network of macromolecular surfactant. Generally, particulate materials that are transported downhole with conventional carrier fluids may settle due to delays in the servicing operations and/or insufficient carrier fluid viscosity.

In an embodiment, the WSF comprising a particulate material and a macromolecular surfactant of the type disclosed herein may advantageously provide an enhanced conductivity of the particulate material pack (e.g., a proppant pack, a gravel pack, or combinations thereof), due to the enhanced volume of the particulate material pack when compared to a particulate material pack created by the same amount of particulate material in the absence of the macromolecular surfactant.

In an embodiment, the WSF comprising a particulate material and a macromolecular surfactant of the type disclosed herein may advantageously use a low amount of macromolecular surfactant, which translates into a lower cost for the WSF required to suspend and transport a certain amount of particulate material, when compared to the cost of a conventional carrier fluid that would be necessary for suspending and transporting the same amount of particulate material.

In an embodiment, the WSF comprising a particulate material and a macromolecular surfactant of the type disclosed herein may advantageously eliminate the need for using crosslinkers, breakers, pH buffering agents, thus providing a simple and cost effective method for suspending and transporting a particulate material.

In an embodiment, the WSF comprising a particulate material and a macromolecular surfactant of the type disclosed herein may advantageously provide fines migration control. In an embodiment, a particulate material pack (e.g., a proppant pack, a gravel pack, or combinations thereof) may advantageously function as a formation fine control system. Additional advantages of the WSF system and/or the methods of using the same may be apparent to one of skill in the art viewing this disclosure.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

The properties of a fluid comprising a particulate material were investigated. More specifically the ability of a fluid to suspend a particulate material were investigated in the presence and in the absence of a macromolecular surfactant and an oleaginous fluid. Two identical glass containers were used as shown in FIG. 1: a control glass container 10 and a test glass container 20. 150 mL of water and 72 g of 20/40 mesh CARBOHSP proppant were added to each of the two glass containers. 20/40 mesh CARBOHSP proppant is a high strength sintered bauxite proppant with a particle size between 20 mesh and 40 mesh, U.S. Sieve Series, and is commercially available from Carbo Ceramics. 1 g of hydrophobically modified polyethylenimine and 2.5 g of LCA-1 paraffinic solvent were also added to the test glass container 20. The hydrophobically modified polyethylenimine was prepared and used at a 40 wt. % solution in the LCA-1 paraffinic solvent, wherein the wt. % was based on the total weight of the solution. The hydrophobically modified polyethylenimine was prepared and used at a 40 wt. % solution for ease of handling. Each of the two glass containers were vigorously shaken for 60 s, and then the glass containers were allowed to sit for 10 min until the picture displayed in FIG. 1 was taken. The control glass container 10 displayed two distinct phases, a settled CARBOHSP proppant phase 30 and a supernatant water phase 40, indicating that plain water cannot suspend the proppant. The test glass container 20 displayed one single phase 50 containing the CARBOHSP proppant homogeneously suspended in the oil-in-water emulsion formed by the water, LCA-1 paraffinic solvent and the hydrophobically modified polyethylenimine. This result indicated that the formed oil-in-water emulsion can suspend and transport the proppant downhole.

The oil-in-water emulsion that had formed in the test glass container 20 was broken by heating at 200° F. for 30 min in a water bath. After the oil-in-water emulsion was broken, the CARBOHSP proppant settled down to the bottom of the glass container. The upper layer of liquid was decanted and the CARBOHSP proppant was rinsed 2-3 times with 150 mL aliquots of tap water. The resulting settled treated CARBOHSP proppant pack was observed to be about 25% higher than the settled untreated CARBOHSP proppant phase 30 from the control glass container 10. Then 150 mL of tap water was added to the treated CARBOHSP proppant pack followed by 1 g of coal fines, and the test glass container 20 was vigorously shaken. Generally, coal fines tend to either float or suspend in water. However, after adding the coal fines to the treated CARBOHSP proppant, the surface of the treated CARBOHSP proppant was coated with black coal fines, and no coal fines were observed in the water phase. The coal fines were locked completely by the treated CARBOHSP proppant.

ADDITIONAL DISCLOSURE

A first embodiment, which is a method of servicing a wellbore in a subterranean formation comprising:

preparing a wellbore servicing fluid comprising a particulate material, an aqueous base fluid, an oleaginous fluid, and a macromolecular surfactant; and placing the wellbore servicing fluid in the wellbore and/or subterranean formation to consolidate and/or enhance conductivity of at least a portion of the wellbore and/or subterranean formation.

A second embodiment, which is the method of the first embodiment wherein the wellbore servicing fluid forms an oil-in-water emulsion with the oleaginous fluid discontinuously dispersed throughout a continuous aqueous phase and wherein the oil-in-water emulsion suspends the particulate material within the wellbore servicing fluid during transport.

A third embodiment, which is the method of the second embodiment wherein the oil-in-water emulsion is characterized by a particulate material settling velocity of from about $10^{-10}$ m/s to about $10^{-2}$ m/s.

A fourth embodiment, which is the method of any of the first through the third embodiments wherein the macromolecular surfactant comprises a hydrophobically modified nitrogen-containing polymer.

A fifth embodiment, which is the method of the fourth embodiment wherein the hydrophobically modified nitrogen-containing polymer comprises a hydrophobically modified polyethyleneimine, a hydrophobically modified polyimine, a hydrophobically modified polyimide, a hydrophobically modified polyamine, a hydrophobically modified polyamide, a hydrophobically modified chitosan, a hydrophobically modified polyetheramine, a hydrophobically modified polyhydroxyetheramine, a hydrophobically modified polylysine, hydrophobically modified poly(dimethylaminoethyl methacrylate), hydrophobically modified poly(dimethylaminopropyl methacrylamide), poly(alkyldimethylammoniumethyl methacrylate), poly(octadecyldimethylammoniumethyl methacrylate), poly(hexadecyldimethylammoniumethyl methacrylate), poly(octadecyldimethylammoniumethyl methacrylamide), poly(hexadecyldimethyl-ammoniumpropyl methacrylamide), acrylamide/octadecyldimethylammoniumethyl methacrylate bromide copolymer, dimethylaminoethyl methacrylate/vinyl pyrrolidone/hexadecyldimethylammoniumethyl methacrylate bromide terpolymer, acrylamide/2-acrylamido-2-methyl propane sulfonic acid/2-ethylhexyl methacrylate terpolymer, amino methacrylate/alkyl amino methacrylate copolymer, dimethylaminoethyl methacrylate/alkyl-dimethylammoniumethyl methacrylate copolymer, dimethylaminoethyl methacrylate/hexadecyldimethylammoniumethyl methacrylate copolymer, dimethylaminoethyl methacrylate/hexadecyldimethylammoniumethyl methacrylate bromide copolymer, dimethylammoniumethyl methacrylate/cetyldimethylammoniumethyl methacrylate copolymer, dimethylaminoethyl acrylate/acrylate/alkyldimethylammoniumethyl acrylate copolymer, or combinations thereof A sixth embodiment, which is the method of the fifth embodiment wherein the hydrophobically modified polyethyleneimine comprises a compound characterized by Structure I:

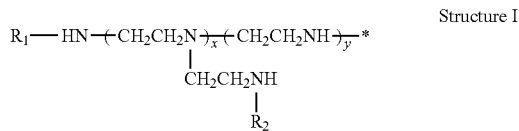

Structure I wherein $R_1$ and $R_2$ can each independently be hydrogen, a $C_2$-$C_{26}$ alkyl group, a $C_4$-$C_{28}$ fatty acid, or combinations thereof; the repeating ethyleneimine (—$CH_2CH_2N$—) unit may occur x times with the value of x ranging from about 2 to about 30,000; the repeating ethyleneimine (—$CH_2CH_2NH$—) unit may occur y times with the value of y ranging from about 2 to about 30,000; and "*" represents the remainder of the polymer molecule.

A seventh embodiment, which is the method of any of the first through the sixth embodiments wherein the macromolecular surfactant has a weight average molecular weight of from about 300 Da to about 4,000,000 Da.

An eighth embodiment, which is the method of any of the first through the seventh embodiments wherein the macromolecular surfactant is present in the wellbore servicing fluid in an amount of from about 0.1 wt. % to about 5 wt. % based on the total weight of the wellbore servicing fluid.

A ninth embodiment, which is the method of any of the first through the eighth embodiments wherein the oleaginous fluid comprises petroleum oils, natural oils, synthetically-derived oils, diesel oil, fuel oil, kerosene oil, mixtures of crude oil, mineral oil, synthetic oil, vegetable oils, olefins, polyolefins, alpha-olefins, internal olefins, polydiorganosiloxanes, acetals, esters, diesters of carbonic acid, linear or branched paraffins, or combinations thereof.

A tenth embodiment, which is the method of any of the first through the ninth embodiments wherein the oleaginous fluid is present in the wellbore servicing fluid in an amount of from about 0.01 wt. % to about 10 wt. % based on the total weight of the wellbore servicing fluid.

An eleventh embodiment, which is the method of any of the first through the tenth embodiments wherein the wellbore servicing fluid is a fracturing fluid.

A twelfth embodiment, which is the method of any of the first through the tenth embodiments wherein the wellbore servicing fluid is a gravel packing fluid.

A thirteenth embodiment, which is the method of any of the first through the twelfth embodiments wherein the particulate material comprises a proppant, a gravel, or combinations thereof.

A fourteenth embodiment, which is the method of any of the first through the thirteenth embodiments wherein placing the wellbore servicing fluid in the wellbore and/or subterranean formation forms a particulate material pack in a fracture, wherein the particulate material pack comprises a particulate material and a macromolecular surfactant.

A fifteenth embodiment, which is the method of the fourteenth embodiment wherein the particulate material pack comprises a proppant pack, a gravel pack or combinations thereof.

A sixteenth embodiment, which is the method of any of the fourteenth through the fifteenth embodiments wherein the volume of the particulate material pack is from about 10% to about 300% greater than the volume of a particulate material pack that would be created by the same amount of particulate material in the absence of the macromolecular surfactant.

A seventeenth embodiment, which is the method of any of the fourteenth through the sixteenth embodiments wherein the wellbore servicing fluid breaks and yields a particulate material pack structure comprising a particulate material pack flow channel space.

An eighteenth embodiment, which is the method of the seventeenth embodiment wherein the particulate material pack flow channel space is from about 1% to about 50% greater than a particulate material pack flow channel space that would be created by the same amount of particulate material in the absence of the macromolecular surfactant.

A nineteenth embodiment, which is the method of any of the fourteenth through the eighteenth embodiments wherein the particulate material pack further comprises fines, wherein the fines are retained by interactions with hydrophobic modifications of the macromolecular surfactant.

A twentieth embodiment, which is the method of any of the first through the nineteenth embodiments wherein the particulate material is present in the wellbore servicing fluid in an amount of from about 0.1 ppg to about 28 ppg based on the total volume of the wellbore servicing fluid.

A twenty-first embodiment, which is the method of any of the first through the twentieth embodiments wherein the wellbore servicing fluid further comprises a coupling agent.

A twenty-second embodiment, which is the method of the twenty-first embodiment wherein the coupling agent comprises silanes, vinyl silane, vinyltrichlorosilane, vinyltrimethoxysilane, vinyltriethoxysilane, vinyltris(2-methoxyethoxy)silane, vinyltrisisopropoxysilane, vinyltris(t-butylperoxy)silane, vinyldimethylchlorosilane, vinyldimethylethoxysilane, vinylmethyldichlorosilane, vinylmethyldimethoxysilane, vinylmethyldiethoxysilane, methylvinyldi(N-methylacetylamido)silane, methylvinyldi(5-caprolactam)silane, bis(methyldichlorosilyl)ethane, 2,4,6,8-tetramethyl-2,4,6,8-tetravinyl-cyclotetrasiloxane, 1,3,5-trivinyl-1,3,5-trimethylcyclotrisiloxane, epoxy silanes, 3-glycidoxypropyltrimethoxysilane, 3-glycidoxypropyltriethoxysilane, 3-glycidoxypropyl-methyldiethoxysilane, 3-glycidoxypropylmethyldimethoxysilane, 2-(3,4-epoxycyclohexyl)-ethyltrimethoxysilane, 2-(3,4-epoxycyclohexyl)-ethyltriethoxysilane, amino silanes, N-(3-triethoxysilylpropyl)amine, 3-aminopropylsilanetriol, bis[(3-triethoxysilyl)propyl]amine, N-(3-trimethoxysilylpropyl)amine, bis[(3-trimethoxysilyl)propyl]amine, N-(3-methyldimethoxysilylpropyl)amine, 3-methyldimethoxysilylpropylamine, N-(2-aminoethyl)-3-aminopropyl-trimethoxysilane, N-(2-aminoethyl)-3-aminopropyltriethoxysilane, N-(2-aminoethyl)-3-aminopropylmethyldimethoxysilane, N-(3-trimethoxysilylpropyl)diethylenetriamine, N-(3-methyldimethoxysilylpropyl)diethylenetriamine, methyldimethoxysilylpropylpiperazine, N-3-(trimethoxysilyl)-propylcyclohexylamine, N-3-(methyldimethoxysilyl)-propylcyclohexylamine, N-(trimethoxysilylmethyl)aniline, N-(triethoxysilylmethyl)aniline, N-(3-trimethoxysilyl-propyl)aniline, N-(3-triethoxysilylpropyl)aniline, diethylaminomethyltriethoxysilane, diethyl-aminomethylmethyldiethoxysilane, 3-(trimethoxysilylpropyl)diethylamine, 3-(N,N-dimethylaminopropyl)-aminopropyl-methyldimethoxysilane, sulfur silanes, ureido silanes, isocyanate silanes, mercapto silanes, methacryloxy silanes, chloro silanes, alkyl silanes, alkoxy silanes, oximino silanes, acetoxy silanes, phenyl silanes, silazanes, siloxanes, silanols, or combinations thereof.

A twenty-third embodiment, which is the method of servicing a wellbore in a subterranean formation comprising:
preparing a wellbore servicing fluid comprising a particulate material, an aqueous base fluid, an oleaginous fluid, and a macromolecular surfactant, wherein the particulate material comprises sand, and the macromolecular surfactant comprises a hydrophobically modified polyethyleneimine; and
placing the wellbore servicing fluid in the wellbore and/or subterranean formation to consolidate and/or enhance conductivity of at least a portion of the wellbore and/or subterranean formation.

A twenty-fourth embodiment, which is the method of the twenty-third embodiment wherein the wellbore servicing fluid forms an oil-in-water emulsion to suspend and transport the sand, wherein the oil-in-water emulsion is characterized by a particulate material settling velocity of from about $10^{-10}$ m/s to about $10^{-2}$ m/s.

A twenty-fifth embodiment, which is the method of any of the twenty-third through the twenty-fourth embodiments wherein the wellbore servicing fluid is a fracturing fluid or a gravel packing fluid.

A twenty-sixth embodiment, which is the wellbore servicing fluid comprising a particulate material, an aqueous base fluid, an oleaginous fluid, and a macromolecular surfactant, wherein the macromolecular surfactant comprises a hydrophobically modified nitrogen-containing polymer, wherein the wellbore servicing fluid forms an oil-in-water emulsion with the oleaginous fluid discontinuously dispersed throughout a continuous aqueous phase and wherein the oil-in-water emulsion suspends the particulate material within the wellbore servicing fluid during transport.

A twenty-seventh embodiment, which is the method of the twenty-sixth embodiment wherein the oil-in-water emulsion is characterized by a particulate material settling velocity of from about $10^{-10}$ m/s to about $10^{-2}$ m/s.

A twenty-eighth embodiment, which is the particulate material pack formed upon placement of the wellbore servicing fluid of claim 26 in a wellbore and/or subterranean formation, wherein the particulate material pack comprises a structural arrangement of the particulate material and the macromolecular surfactant within one or more fractures.

A twenty-ninth embodiment, which is the particulate material pack of the twenty-eighth embodiment further comprising fines, wherein the fines are retained by interactions with hydrophobic modifications of the macromolecular surfactant.

A thirtieth embodiment, which is the method for preparing a wellbore servicing fluid comprising:
contacting a particulate material, an aqueous base fluid, an oleaginous fluid, and a macromolecular surfactant; and
mixing the particulate material, the aqueous base fluid, the oleaginous fluid, and the macromolecular surfactant to form an oil-in-water emulsion to suspend and transport the particulate material to a desired location in a wellbore and/or subterranean formation.

A thirty-first embodiment, which is the method of the thirtieth embodiment wherein the oil-in-water emulsion is characterized by a particulate material settling velocity of from about $10^{-10}$ m/s to about $10^{-2}$ m/s.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U—R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore in a subterranean formation comprising:
preparing a wellbore servicing fluid comprising a particulate material, an aqueous base fluid, an oleaginous fluid, and a macromolecular additive, wherein the macromolecular additive is a hydrophobically modified polyethyleneimine comprising a compound characterized by Structure I:

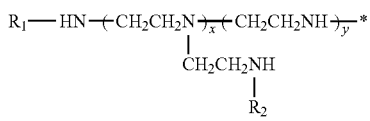

Structure I and wherein $R_1$ and $R_2$ can each independently be a $C_{11}$-$C_{26}$ alkyl group, a $C_4$-$C_{28}$ fatty acid, or combinations thereof; the ethyleneimine (—$CH_2CH_2N$—) unit occurs x times with the value of x ranging from about 2 to about 30,000; the ethyleneimine (—$CH_2CH_2NH$—) unit occurs y times with the value of y ranging from about 2 to about 30,000; and "*" represents the remainder of the polymer molecule;
forming an oil-in-water emulsion with the oleaginous fluid discontinuously dispersed throughout a continuous aqueous phase, wherein the oil-in-water emulsion suspends the particulate material within the wellbore servicing fluid during transport and the oil-in-water emulsion is characterized by a particulate material settling velocity of from about $10^{-10}$ m/s to about $10^{-2}$ m/s; and
placing the wellbore servicing fluid in the wellbore and/or subterranean formation to consolidate and/or enhance conductivity of at least a portion of the wellbore and/or subterranean formation.

2. The method of claim 1 wherein the macromolecular additive has a weight average molecular weight of from about 300 Da to about 4,000,000 Da.

3. The method of claim 1 wherein the macromolecular additive is present in the wellbore servicing fluid in an amount of from about 0.1 wt. % to about 5 wt. % based on the total weight of the wellbore servicing fluid.

4. The method of claim 1 wherein the wellbore servicing fluid is a fracturing fluid or a gravel packing fluid.

5. The method of claim 1 wherein the particulate material comprises a proppant, a gravel, or combinations thereof.

6. The method of claim 1 wherein placing the wellbore servicing fluid in the wellbore and/or subterranean formation forms a particulate material pack in a fracture, wherein the particulate material pack comprises a particulate material and a macromolecular additive.

7. The method of claim 6 wherein the volume of the particulate material pack is from about 10% to about 300% greater than the volume of a particulate material pack that would be created by the same amount of particulate material in the absence of the macromolecular additive.

8. The method of claim 6 wherein the wellbore servicing fluid breaks and yields a particulate material pack structure comprising a particulate material pack flow channel space.

9. The method of claim 8 wherein the particulate material pack flow channel space is from about 1% to about 50% greater than a particulate material pack flow channel space that would be created by the same amount of particulate material in the absence of the macromolecular additive.

10. The method of claim 6 wherein the particulate material pack further comprises fines, wherein the fines are retained by interactions with hydrophobic modifications of the macromolecular additive.

11. The method of claim 1 wherein the particulate material is present in the wellbore servicing fluid in an amount of from about 0.1 ppg to about 28 ppg based on the total volume of the wellbore servicing fluid.

12. The method of claim 1 wherein the wellbore servicing fluid further comprises a coupling agent selected from the group consisting of: silanes, vinyl silane, vinyltrichlorosilane, vinyltrimethoxysilane, vinyltriethoxysilane, vinyltris(2-methoxyethoxy)silane, vinyltrisisopropoxysilane, vinyltris(t-butylperoxy)silane, vinyldimethylchlorosilane, vinyldimethylethoxysilane, vinylmethyldichlorosilane, vinylmethyldimethoxysilane, vinylmethyldiethoxysilane, methylvinyldi(N-methylacetylamido)silane, methylvinyldi(5-caprolactam)silane, bis(methyldichlorosilyl)ethane, 2,4,6,8-tetramethyl-2,4,6,8-tetravinyl-cyclotetrasiloxane, 1,3,5-trivinyl-1,3,5-trimethylcyclotrisiloxane, epoxy silanes, 3-glycidoxypropyltrimethoxysilane, 3-glycidoxypropyltriethoxysilane, 3-glycidoxypropyl-methyldiethoxysilane, 3-glycidoxypropylmethyldimethoxysilane, 2-(3,4-epoxycyclohexyl)-ethyltrimethoxysilane, 2-(3,4-epoxycyclohexyl)-ethyltriethoxysilane, amino silanes, N-(3-triethoxysilylpropyl)amine, 3-aminopropylsilanetriol, bis[(3-triethoxysilyl)propyl]amine, N-(3-trimethoxysilylpropyl)amine, bis[(3-trimethoxysilyl)propyl]amine, N-(3-methyldimethoxysilylpropyl)amine, 3-methyldimethoxysilylpropylamine, N-(2-aminoethyl)-3-aminopropyl-trimethoxysilane, N-(2-aminoethyl)-3-aminopropyltriethoxysilane, N-(2-aminoethyl)-3-aminopropylmethyldimethoxysilane, N-(3-trimethoxysilylpropyl)diethylenetriamine, N-(3-methyldimethoxysilylpropyl)diethylenetriamine, methyldimethoxysilylpropylpiperazine, N-3-(trimethoxysilyl)-propylcyclohexylamine, N-3-(methyldimethoxysilyl)-propylcyclohexylamine, N-(trimethoxysilylmethyl) aniline, N-(triethoxysilylmethyl)aniline, N-(3-trimethoxysilyl-propyl)aniline, N-(3-triethoxysilylpropyl) aniline, diethylaminomethyltriethoxysilane, diethylaminomethylmethyldiethoxysilane, 3-(trimethoxysilylpropyl)diethylamine, 3-(N,N-dimethylaminopropyl)-aminopropyl-methyldimethoxysilane, sulfur silanes, ureido silanes, isocyanate silanes, mercapto silanes, methacryloxy silanes, chloro silanes, alkyl silanes, alkoxy silanes, oximino silanes, acetoxy silanes, phenyl silanes, silazanes, siloxanes, silanols, or combinations thereof.

* * * * *